(12) United States Patent
Romes

(10) Patent No.: US 9,646,329 B2
(45) Date of Patent: May 9, 2017

(54) CONFIGURABLE ELECTRONIC BUSINESS CARD

(71) Applicant: Autodesk, Inc., San Rafael, CA (US)

(72) Inventor: Christopher C. Romes, West Linn, OR (US)

(73) Assignee: Autodesk, Inc., San Rafael, CA (US)

( * ) Notice: Subject to any disclaimer, the term of this patent is extended or adjusted under 35 U.S.C. 154(b) by 49 days.

(21) Appl. No.: 14/720,580

(22) Filed: May 22, 2015

(65) Prior Publication Data

US 2016/0343039 A1 Nov. 24, 2016

(51) Int. Cl.
*G06Q 30/02* (2012.01)

(52) U.S. Cl.
CPC ..... *G06Q 30/0276* (2013.01); *G06Q 30/0241* (2013.01)

(58) Field of Classification Search
None
See application file for complete search history.

(56) References Cited

U.S. PATENT DOCUMENTS

| | | | |
|---|---|---|---|
| 6,633,311 B1 * | 10/2003 | Douvikas | G06Q 10/10 715/731 |
| 6,889,213 B1 * | 5/2005 | Douvikas | G06F 17/30067 705/1.1 |
| 2002/0116396 A1 * | 8/2002 | Somers | G06F 17/30575 |
| 2009/0153493 A1 * | 6/2009 | Mizutani | G06F 3/04883 345/173 |
| 2011/0218965 A1 * | 9/2011 | Lee | G06F 21/305 707/640 |
| 2013/0036480 A1 * | 2/2013 | Anderson | H04L 63/0853 726/30 |
| 2014/0064694 A1 * | 3/2014 | Zealer | H04N 5/76 386/230 |
| 2014/0172784 A1 * | 6/2014 | Choi | G06F 17/30289 707/609 |
| 2015/0213353 A1 * | 7/2015 | Cuervo | G06K 19/07749 235/492 |

* cited by examiner

*Primary Examiner* — Asher Kells
(74) *Attorney, Agent, or Firm* — Fish & Richardson P.C.

(57) ABSTRACT

Methods, systems, and apparatus include computer programs encoded on a computer-readable storage medium, including an electronic business card system including plural electronic business cards. Each card is a one-way dedicated presentation device for presenting information about a user to card-holder. The card is hand-held, associated with a single user, and includes a display element and a memory to store information associated with the user. Information is loaded onto the card for presentation on the display element. The card includes an electronic interface for receiving the information and commands for controlling presentation of at least a portion of the information on the display element. The card further includes a controller to control presentation of selected portions of the information based on configuration commands received via the electronic interface. A configuration element can receive configuration instructions for setting a level of detail for information presentation on a specific instantiation of the card.

19 Claims, 3 Drawing Sheets

CONFIGURABLE ELECTRONIC BUSINESS CARD

BACKGROUND

This specification relates to information presentation.

People can provide a business card to another person for many reasons. The business card can contain a card-giver's name, business information (e.g., company name, address, phone number), contact information (e.g., the card-giver's business and/or personal phone number), and other information. Different card recipients may need or use different information.

SUMMARY

In general, one innovative aspect of the subject matter described in this specification can be implemented in systems that include an electronic business card system for providing business information. The electronic business card system includes one or more electronic business cards. An electronic business card is of the form of a one-way dedicated presentation device for presenting information about a user to an intended recipient that possesses the electronic business card, the electronic business card being hand-held and associated with a single user. The electronic business card includes a display element. The electronic business card further includes a memory operable to store information associated with the user. The information is loaded onto the electronic business card for presentation on the display element. The electronic business card further includes an electronic interface operable to receive the information and one or more commands for controlling presentation of at least a portion of the information on the display element. The electronic business card further includes a controller operable to control presentation of a selected portion of the information based on configuration commands received via the electronic interface. The electronic business card system further includes a configuration element operable to receive configuration instructions from the user for setting a level of detail for information to be presented on a specific instantiation of the electronic business card. The configuration element evaluates received configuration instructions received from the user and sets a level of detail for the specific instantiation of the electronic business card. The configuration element further communicates a level of detail command to the specific instantiation of the electronic business card to enable configuration of the specific instantiation of the electronic business card so as to present a user-selectable portion of the information on the display of the specific instantiation of the electronic business card.

These and other implementations can each optionally include one or more of the following features. The electronic business card can be configured to store plural different levels of detail about the user. The level of detail command can identify a specific level of detail from the plural different levels of detail about the user. The controller can be operable to control display on the display element of only information associated with the specific level of detail to the recipient. The configuration element can be associated with a storage element that stores the information about the user including information at plural different levels of detail. The configuration element can be operable to provide the information to the electronic business card via the electronic interface. The configuration element can provide only a selected portion of the information to a specific instantiation of the electronic business card based at least in part on the received configuration instructions. The plural different levels of detail can include a business-only level, a personal-only level, a business-and-personal level, and a customized level. The business-only level can be associated with business contact information of the user. The personal-only level can be associated with personal contact information for the user. The business-and-personal level can include at least a portion of both the business and personal contact information. The customized level can include a user-selected combination of business contact, personal contact and other information. The memory can include all of the information on each instantiation of the electronic business card, but the controller can control which portion is available for display on the display element based on commands received from the configuration element. The configuration element can be integrated into the electronic business card. The electronic business card can be remotely erasable so as to enable erasing the information in the memory without having to have physical possession of the electronic business card. The electronic business card can be reconfigurable over time. The configuration element can be operable to provide a reconfiguration command so as to enable the specific instantiation of the electronic business card to present different information from memory after a reconfiguration. The electronic business card can further include a security element. The security element can be configured to control when information is presented on the display element and only after verification of the intended recipient. The security element can include a biometric sensor. The electronic business card can further include a transferring element operable to transmit information from the electronic business card to a receiving device.

In general, another innovative aspect of the subject matter described in this specification can be implemented in methods that include a computer-implemented method for presenting business card information. The method includes receiving configuration instructions for configuring a specific instantiation of an electronic business card to be provided to an intended recipient. The configuration instructions include instructions for setting a level of detail for information to be presented on the specific instantiation of the electronic business card. The method further includes identifying information about the user, the information including a plurality of levels of detail including at least two different levels of detail. The method further includes evaluating the received configuration instructions and setting a level of detail for the specific instantiation of the electronic business card. Setting the level of detail includes identifying a portion of information from the identified information for storage on the specific instantiation of the electronic business card. Setting the level of detail further includes communicating a level of detail command to the specific instantiation of the electronic business card to enable configuration of the specific instantiation of the electronic business card so as to present a user-selectable portion of the information on a display of the specific instantiation of the electronic business card. The method further includes presenting, by the specific instantiation of the electronic business card when prompted, the information about the user at a level of detail in accordance with the received configuration instructions without displaying other portions of information about the user that are at a different level of detail.

Particular implementations may realize none, one or more of the following advantages. Users can control, on a per-instance or a per-card-holder basis, the extent of information displayable on an electronic business card. Users can set up and categorize card-holders among different levels of detail associated with presentation of information to particular card-holders.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for providing a configurable electronic business card. For example, an electronic business card can be configured (e.g., programmed) to present different levels of detail to a card-holder depending on the desires of the card-giver who owns information that is presented on the electronic business card. The type and/or amount of information displayed on the electronic business card can be determined, e.g., in real-time, based on current configuration information associated with the electronic business card and the card-holder. For example, a basic configuration of the electronic business card may present, for example, only business information. A more detailed configuration may present, for example, a personal cell phone number, a home address, and/or other more personal pieces of information. The information presented may be static (e.g., as of the time of receiving) or dynamic in that it can be updated over time (e.g., by linking to a service). The electronic business card can be programmed based on information provided by the user (e.g., card-giver) to set the level of detail, and reprogrammed to change the level as required, such as to provide real-time updates. Other capabilities can exist, e.g., to erase or turn off certain information in the electronic business card for one or more specified card-holders, or to change information on the electronic business card.

In some implementations, the card-giver of the electronic business card can identify, for each person who holds an instance of the electronic business card, the level of detail for which the card-holder is granted. At a subsequent time, for example, the card-giver can promote (or demote) the level of detail of a particular card-holder, such as to change the card-holder-type applicable to the card-holder. For example, a card-holder can be categorized as public, personal friend, business associate, co-worker, vendor, customer, or some other card-holder type.

Figure 1:
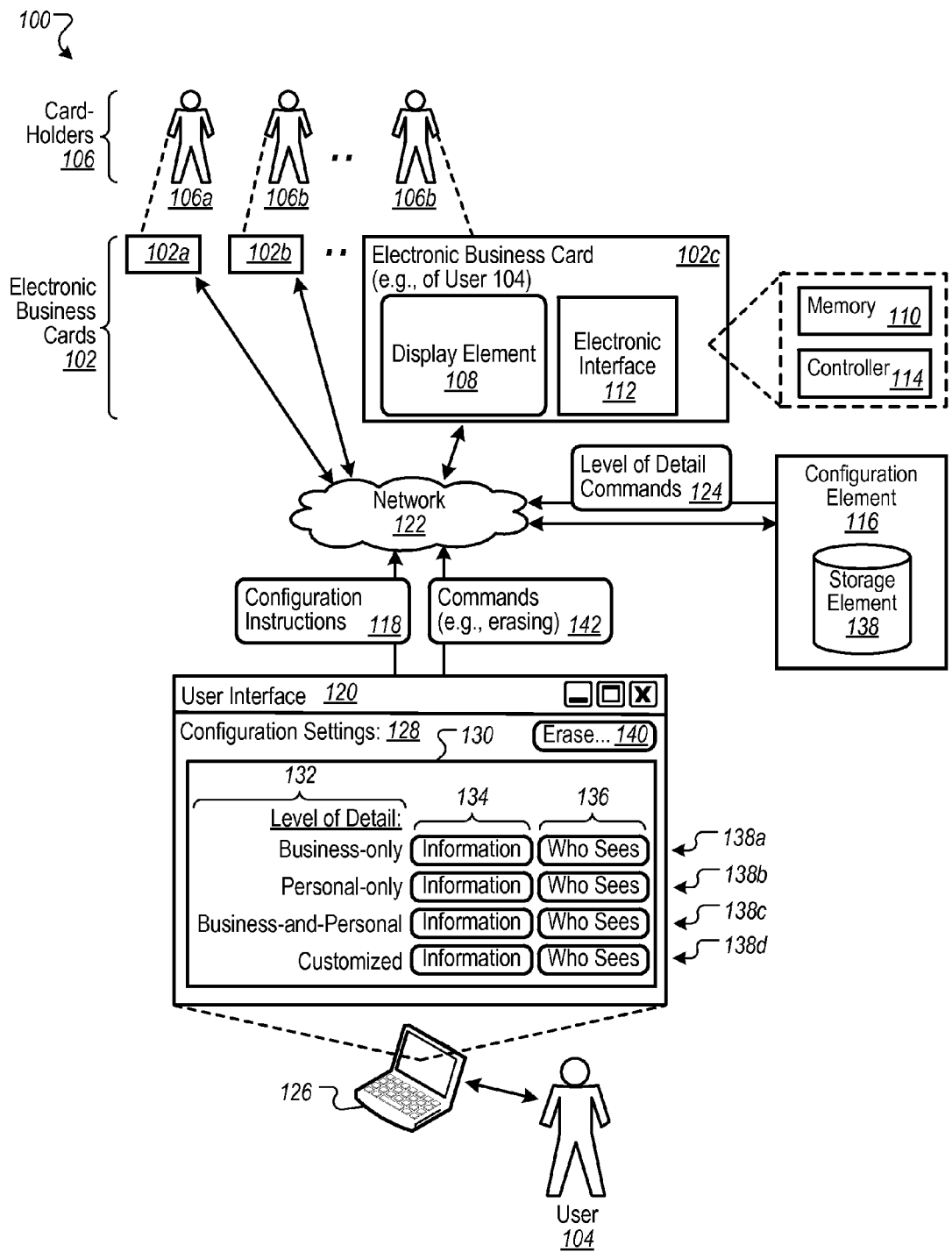
FIG. 1 is a block diagram of an example electronic business card system.

FIG. 1 is a block diagram of an example electronic business card system 100. The electronic business card system 100 (hereafter system 100) facilitates and controls the use of one or more electronic business cards 102. In some implementations, each electronic business card 102 can be of the form, for example, of a one-way, dedicated presentation device for presenting information about a user to an intended recipient (e.g., a card-holder 106) that possesses the electronic business card 102. As an example, the electronic business card 102 can be hand-held by each of the card-holders 106 and associated with a single user, e.g., a user 104 that is the card-giver. In some implementations, the electronic business card 102 can replace, or serve the purpose of, a non-electronic (e.g., paper, cardboard or plastic) business card, but the electronic business card can include the features described herein.

The electronic business card 102 includes a display element 108 for presenting information stored with reference to the electronic business card 102, e.g., including information about the user 104. The display element 108 can also serve, for example, as a user interface for interaction between the card-holder 106 and the electronic business card 102. The interaction can include, for example, commands for scrolling through the presented information, displaying prompts, and for other purposes.

A memory 110 that is included in the electronic business card 102 can store information associated with the user 104. For example, the information stored in memory 110 can be loaded onto the electronic business card 102 for presentation on the display element 108. In some implementations, information associated with the user 104 that is stored in the memory 110 can be encrypted.

In some implementations, the electronic business card 102 can include a security element. For example, the security element can be configured to control when information is presented on the display element 108 and only after verification of the intended recipient, e.g., using a biometric sensor, such as a fingerprint. Other security features can use password protection, personal identification numbers (PINs), voice recognition, and pattern matching.

In some implementations, the electronic business card 102 can include a transferring element operable to transmit information from the electronic business card 102 to a receiving device. Transmission can be, for example, by Bluetooth, near-field communication, WiFi or other communication protocol. Information transmitted by the transferring element can include credentials and/or a security level used to unlock or allow use of (and/or specific functionality for) a particular device, a machine, or some other receiving device or object.

An electronic interface 112 that is included in the electronic business card 102 can receive the information stored in memory 110 and one or more commands for controlling presentation of at least a portion of the information on the display element 108. For example, the electronic interface 112 can serve as the electronic business card's interface with external elements, including a configuration element 116, described below.

In some implementations, the electronic business card 102 can further include a user interface, e.g., by which the card-holder 106 can partially control aspects of the display element 108 and/or turn the electronic business card 102 off and on.

A controller 114 that is included in the electronic business card 102 can control presentation of a selected portion of the information based on configuration commands received via the electronic interface 112. For example, the controller 114 can control how the information is presented, e.g., displayed to the card-holder 106. The controller 114 can also process commands entered by the card-holder through a card-holder user interface or provided by an external service (e.g., the configuration element 116).

In some implementations, the memory 110 can include all of the information on each instantiation of the electronic business card 102, and the controller 114 can control which portion is available for display on the display element 108 based on level of detail commands 124 received from the configuration element 116.

In some implementations, the configuration element 116 can be integrated into the electronic business card 102. For example, each electronic business card 102 can include a separate configuration element 116 that receives configuration instructions 118 from the user 104.

A configuration element 116 that is communicatively coupled to the electronic business card 102 can receive configuration instructions 118 from the user 104. For example, the configuration instructions 118 can set a level of detail for information to be presented on a specific instantiation of the electronic business card 102. Instantiations, for example, can include electronic business cards 102*a*-102*c* held by card-holders 106*a*-106*c*, respectively. As an example, the configuration element 116 can evaluate the received configuration instructions 118 in order to set a level of detail for the specific instantiation of the electronic business card (e.g., one of the electronic business cards 102*a*-102*c*). There can be hundreds or thousands of instantiations of the electronic business card 102.

The configuration element 116 can communicate level of detail commands 124 to the specific instantiations of the electronic business card 102 to enable configuration of the specific instantiation of the electronic business card 102. The level of detail commands 124 received by the instantiations can facilitate the presentation of a user-selectable portion of the information on the display of the specific instantiation of the electronic business card 102. For example, based on the information provided by the user 104 in the user interface 120, the display element 108 on each of the electronic business cards 102 can present just the information that the user 104 has intended to be presented to the respective card-holders 106. Further, the information presented to each of the respective card-holders 106 can vary based on the configurations of each instance.

In some implementations, the configuration element 116 can be, for example, associated with a website that receives configuration instructions 118 from the user 104, e.g., entered in a user interface 120, described below. For example, the configuration element 116 can include a website or other resource that is accessible over a network 122, such as a local area network (LAN), a wide area network (WAN), the Internet, or a combination thereof. In some implementations, some or all of the functionality of the configuration element 116 can be incorporated into the electronic business card 102.

The user interface 120, for example, can be presented on a client device 126 that belongs to the user 104. The client device 126 can provide the user interface 120, for example, through a web page (or other resource) or through an application that executes on the client device 126. Other configurations are possible.

Configuration settings 128 in the user interface 120, for example, can allow the user 104 to set levels of detail 132 associated with instances of the electronic business card 102. For example, there can be separate settings 138*a*-138*d* for different levels of detail 132 presented in a settings area 130. The settings 138*a*-138*d* can be associated with, for example, a business-only level, a personal-only level, a business-and-personal level, and a customized level, respectively. In some implementations, business-only level settings 138*a* can be associated with business contact information of the user, e.g., including a business or work phone number. Personal-only level settings 138*b* can be associated with personal contact information for the user, e.g., including a personal phone number. Business-and-personal level settings 138*c* can be associated with at least a portion of both the business and personal contact information. Customized level settings 138*d*, for example, can be associated with user-selected combinations of business contact, personal contact, and/or other information. Other levels of detail 132 are possible.

In some implementations, a default level of detail can be assigned to new instances of the electronic business card 102. For example, by default, an instance of the electronic business card 102 can be configured initially with settings consistent with business-only level settings 138*a*.

In some implementations, an instance of the electronic business card 102 can initially have settings with no levels of detail provided. For example, the user 104 can activate a particular instance of the electronic business card 102 using a user-entered code, a communication from a user-controlled device, or in some other way.

In some implementations, the electronic business card 102 can be configured to store plural different levels of detail about a card-giver. For example, the information for the user 104 stored in memory 110 can include different levels of information for each of the levels of detail 132 associated with the user 104. The level of detail command 124, applicable to one or more instances of the electronic business card 102, can identify a specific level of detail from the plural different levels of detail 132. Upon receipt of a level of detail command 124, for example, the controller 114 can control (e.g., limit) information displayed to the card recipient (e.g., a card-holder 106) on the display element 108 to include only information associated with the specific level of detail.

In some implementations, the configuration element 116 can be associated with a storage element 138 that stores the information about the user 104, including information at plural different levels of detail 132. For example, the storage element 138 can store the information at different levels of detail 132 instead of using the memory 110 to store the information. When the card-holder 106 wishes to display business card information for the user 104, for example, the configuration element 116 can provide the information to the electronic business card 102 via the electronic interface 112.

In some implementations, the configuration element 116 can provide only a selected portion of the information to a specific instantiation of the electronic business card 102 based at least in part on the received configuration instructions 118. For example, the information provided to a particular instance of the electronic business card 102 can include just the information needed for display to the associated card-holder 106, as specified by the configuration instructions 118.

In some implementations, controls 134 can be used to display additional interfaces and/or tools for defining which user information associated with the user 104 is to be visible at a respective level of detail 132. For example, selecting a respective control 134 can allow the user to define (or if needed update) the amount of information available to business-only types of contacts at that respective level of detail 132. In some implementations, information associated with all of the levels of detail 132 can be presented at the same time, e.g., as columns in a grid, table or spreadsheet, or in some other way, so that the user 104 can compare which information is available at each level of detail 132.

Controls 136 can be used, for example, to define and/or display specific card-holders 106 that are assigned to each respective level of detail 132. For example, the user 104 can use a respective control 136 associated with the settings 138a to see which business associates can view business-only information on their instances of the electronic business card 102.

In some implementations, a user interface can be provided that lists the card-holders 106 who currently carry an instance of the electronic business card 102 associated with the user 104. For example, using the user interface, the user 104 can see, at a glance, names of card-holders 106 and the level of detail to which each card-holder 106 is authorized. In some implementations, the information can be presented so that the card-holders 106 are grouped, e.g., by a card-holder-type (e.g., public, personal friend, business associate, co-worker, vendor, customer). In some implementations, controls can be provided so that a display element associated with (and labeled as) a particular card-holder 106 can be dragged-and-dropped to a different group, thus changing the level of detail that the particular card-holder 106 is assigned.

In some implementations, the electronic business card 102 can be remotely erasable so as to enable erasing of information in the memory 110 without having to have physical possession of the electronic business card 102. For example, the user interface 120 can include an erase control 140 that provides access to a screen for identifying particular instances of the electronic business card 102 to be erased. Upon use of the erase control 140 and supplying eraser information, for example, the user interface 120 can send erase commands 142 to the configuration element 116, for subsequent communication with the identified instances.

In some implementations, the electronic business card 102 can be reconfigurable over time. For example, the configuration element 116 can provide a reconfiguration command so as to enable the specific instantiation of the electronic business card 102 to present different information from memory 110 after a reconfiguration. The reconfiguration may allow a particular card-holder 106, e.g., originally configured to view business-only information, to begin viewing business-and-personal information after the reconfiguration.

In some implementations, the electronic business card 102 can be used for other purposes in addition to providing information commonly associated with business cards. For example, other information can be pushed out to one or more instances of the electronic business card 102 on an as-needed basis. The information can originate from the user interface 120 (e.g., by the user entering text and issuing a command), or the information can originate from other sources. In some implementations, the other purposes of the electronic business card 102 can include the use of personal messages, group messages, promotions, discounts, advertisements, images, videos, maps, or other types and formats of information.

In some implementations, the electronic business card 102 can include and/or support digital rights management (DRM) capabilities. For example, in addition to controlling the level of content provided to a particular card-holder 106, the electronic business card 102 can control whether the particular card-holder 106 can distribute the information to others.

In some implementations, the electronic business card 102 can support and/or track cloud, social and/or mobile use of the electronic business card 102. For example, a client side module of the electronic business card 102 can include sensing, reading and display capabilities. An external service (e.g., the configuration element 116 or some other server) can track and store usage data, e.g., tracking the number of people looking at or forwarding the electronic business card 102.

In some implementations, the electronic business card 102 can be used as a unique ID, e.g., holding credentials or a social footprint for providing electronic access to (or synchronize contact and/or networking information on) professional networking sites or other resources. For example, the electronic business card 102 can include radio-frequency identification (RFID) or other components and/or technology. RFID capabilities of the electronic business card 102 can be used, for example, for data transfer and display, or to transfer or provide permissions associated with data on the electronic business card 102. Other uses are possible.

Figure 2:
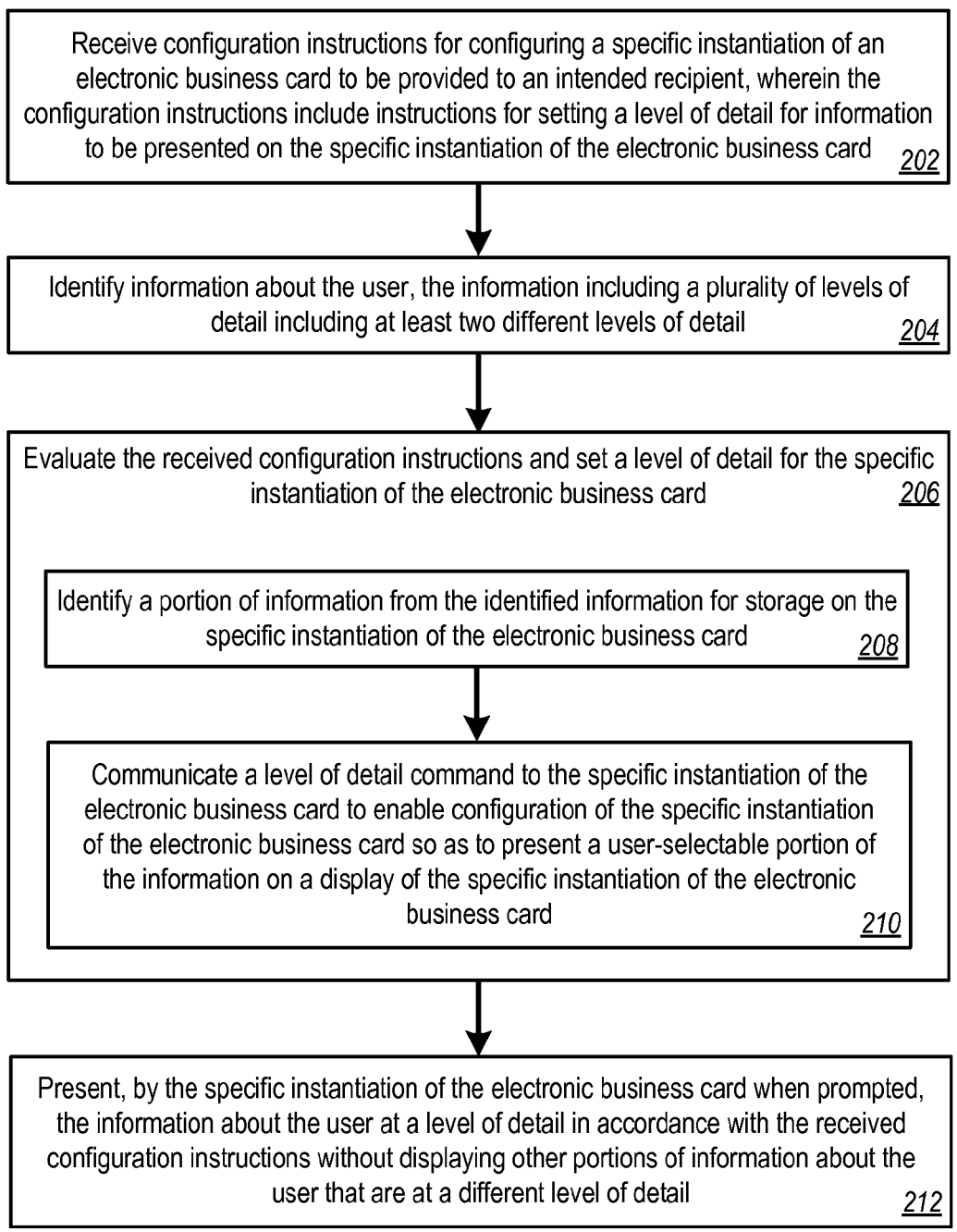
FIG. 2 is a flowchart of an example process for presenting information on an electronic business card.

FIG. 2 is a flowchart of an example process 200 for presenting information on an electronic business card. For example, the information that is presented on a given instance of the electronic business card 102 can depend on a level of detail associated with the card-holder who holds an instance of the electronic business card. In some implementations, the system can perform steps of the process 200 using instructions that are executed by one or more processors. FIG. 1 is used to provide example structures for performing the steps of the process 200.

Configuration instructions are received for configuring a specific instantiation of an electronic business card to be provided to an intended recipient (202). The configuration instructions include instructions for setting a level of detail for information to be presented on the specific instantiation of the electronic business card. For example, the configuration element 116 can receive configuration instructions 118 provided by the user through the user interface 120 for configuring one or more instantiations of the electronic business card 102 for card-holders 106.

In some implementations, the configuration instructions can include the identification of one or more specific instances of the electronic business card 102. For example, the configuration instructions 118 can indicate that the electronic business card 102a is to have a business-only level of detail. Identification of the electronic business card 102a can be made, for example, by using an identifier associated with the electronic business card 102a or by using an identifier (e.g., a name or user identifier) associated with the card-holder 106a. Other ways can be used to identify (and associate levels of detail with) specific instances of electronic business cards 102 or their card-holders 106.

Information about the user is identified (204). The information includes a plurality of levels of detail including at least two different levels of detail. For example, the configuration element 116 can receive information entered by the user 104 through controls 134, including specific information that is to be provided for each of the levels of detail 132.

The received configuration instructions are evaluated, and a level of detail is set for the specific instantiation of the electronic business card (206). Setting the level of detail includes identifying a portion of information from the identified information for storage on/transfer to the specific instantiation of the electronic business card. Setting the level of detail also includes communicating a level of detail command to the specific instantiation of the electronic business card to enable configuration of the specific instantiation of the electronic business card so as to present a user-selectable portion of the information on a display of the specific instantiation of the electronic business card. For example, based on the received configuration instructions 118, the configuration element 116 can send level of detail commands 124 to one or more electronic business cards 102. The level of detail commands 124 sent to a particular instance of the electronic business card 102 can depend on the information that is intended, by the user 104, to be seen by the respective card-holder 106.

At a specific instantiation of the electronic business card and when prompted to display information, the information about the user is presented at a level of detail in accordance with the received configuration instructions (208). The information is presented without displaying other portions of information about the user that are at a different level of detail. For example, although all information for the user and associated with all levels of detail 132 may be stored in memory 110, the controller 114 can use information associated with the received level of detail commands 124 to control the amount of information displayed in the display element 108. In some implementations, the received level of detail commands 124 (or equivalent settings) can be stored in the memory 110.

Figure 3:
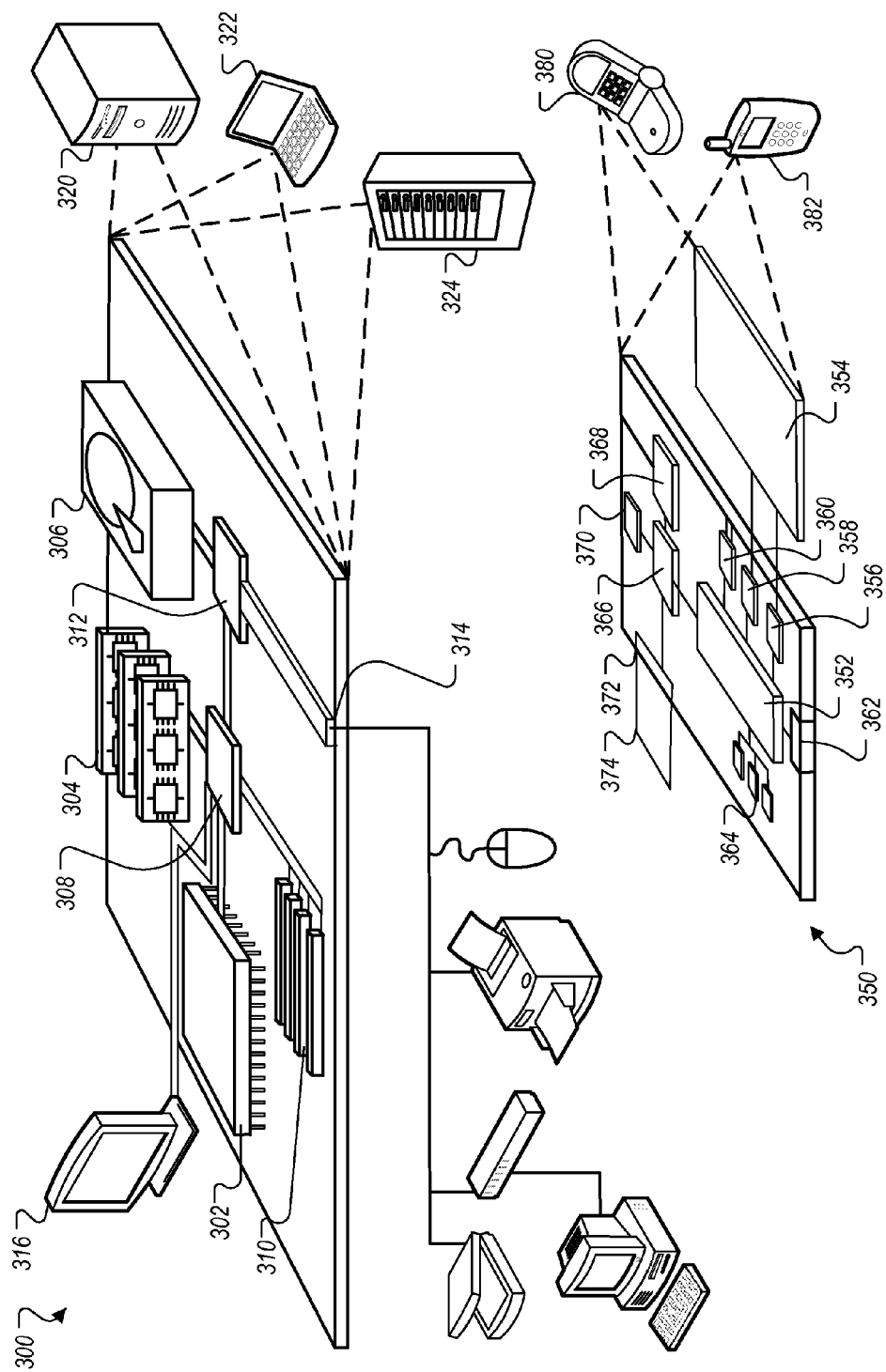
FIG. 3 is a block diagram of an example computer system that can be used to implement the methods, systems and processes described in this disclosure.

FIG. 3 is a block diagram of example computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 300 is further intended to represent any other typically non-mobile devices, such as televisions or other electronic devices with one or more processers embedded therein or attached thereto. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 300 includes a processor 302, memory 304, a storage device 306, a high-speed controller 308 connecting to memory 304 and high-speed expansion ports 310, and a low-speed controller 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed controller 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed bus 314. The low-speed bus 314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as computing device 350. Each of such devices may contain one or more of computing devices 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The computing device 350 may also be provided with a storage device, such as a micro-drive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the computing device 350, such as control of user interfaces, applications run by computing device 350, and wireless communication by computing device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of computing device 350 with other devices. External interface 362 may provide, for example, for wired communication (e.g., via a docking procedure) or for wireless communication (e.g., via Bluetooth® or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to computing device 350 through expansion interface 372, which may include, for example, a subscriber identification module (SIM) card interface. Such expansion memory 374 may provide extra storage space for computing device 350, or may also store applications or other information for computing device 350. Specifically, expansion memory 374 may include instructions to carry out or supplement the processes described above, and may include secure information also. Thus, for example, expansion memory 374 may be provide as a security module for computing device 350, and may be programmed with instructions that permit secure use of computing device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368 (e.g., a radio-frequency transceiver). In addition, short-range communication may occur, such as using a Bluetooth®, WiFi, or other such transceiver (not shown). In addition, GPS receiver module 370 may provide additional wireless data to computing device 350, which may be used as appropriate by applications running on computing device 350.

Computing device 350 may also communicate audibly using audio codec 360, which may receive spoken information from a user and convert it to usable digital information. Audio codec 360 may likewise generate audible sound for a user, such as through a speaker, e.g., in a handset of computing device 350. Such sound may include sound from voice telephone calls, may include recorded sound (e.g., voice messages, music files, etc.) and may also include sound generated by applications operating on computing device 350.

The computing device 350 may be implemented in a number of different forms, as shown in the figure. For example, it may be implemented as a cellular telephone 380. It may also be implemented as part of a smartphone 382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An electronic business card system comprising:
  one or more electronic business cards, an electronic business card being of a form of a one-way dedicated presentation device for presenting information about a user to an intended recipient that possesses the electronic business card, the electronic business card being a hand-held, physical device that includes:
    a display element;
    a memory operable to store information associated with the user, the information being loaded onto the electronic business card for presentation on the display element;
    an electronic interface operable to receive, from a configuration element remote from the electronic business card, the information and one or more commands for controlling presentation of at least a portion of the information on the display element, including commands for initial instantiation of the electronic business card and subsequent reconfiguration commands for changing presentation of information on the electronic business card; and
    a controller operable to control presentation of a selected portion of the information based on configuration commands received from the configuration element remote from the electronic business card and via the electronic interface; and
  the configuration element operable to receive configuration instructions from the user and through a user interface remote from the configuration element and the electronic business card, the instructions for setting a level of detail for information to be presented on a specific instantiation of the electronic business card, the level of detail being controlled through the user interface based on categories of card-holders including a per-card-instance or a per-cardholder-type basis and an extent of business and personal information to be provided to the card-holders in each category, wherein the configuration element:
    evaluates received configuration instructions received from the user, sets a level of detail for the specific instantiation of the electronic business card,
    communicates, using the level of detail based on categories, a level of detail command to the specific instantiation of the electronic business card for initial instantiation of the electronic business card to enable configuration of the specific instantiation of the electronic business card so as to present a user-selectable portion of the information on the display of the specific instantiation of the electronic business card; and
    communicates the subsequent reconfiguration commands for changing presentation of information on the electronic business card.

2. The system of claim 1, wherein the electronic business card is configured to store plural different levels of detail about the user, wherein the level of detail command identifies a specific level of detail from the plural different levels of detail about the user, wherein the intended recipient belongs to a group of card-holders of a given per-cardholder-type for which the specific level of detail applies, and wherein the controller is operable to control, on the display element, display of only information associated with the specific level of detail to the recipient.

3. The system of claim 2, wherein the plural different levels of detail include a business-only level, a personal-only level, a business-and-personal level, and a customized level, wherein the business-only level is associated with business contact information of the user, wherein the personal-only level is associated with personal contact information for the user, wherein the business-and-personal level includes at least a portion of both the business and personal contact information, and wherein the customized level includes a user-selected combination of business contact, personal contact and other information.

4. The system of claim 2, wherein the memory includes all of the information on each instantiation of the electronic business card but the controller controls which portion is available for display on the display element based on commands received from the configuration element.

5. The system of claim 1, wherein the configuration element is associated with a storage element that stores the information about the user including information at plural different levels of detail, and wherein the configuration element is operable to provide the information to the electronic business card via the electronic interface.

6. The system of claim 5, wherein the configuration element provides only a selected portion of the information to a specific instantiation of the electronic business card based at least in part on the received configuration instructions.

7. The system of claim 1, wherein some functionality of the configuration element is integrated into the electronic business card.

8. The system of claim 1, wherein the electronic business card is remotely erasable so as to enable erasing the information in the memory without having to have physical possession of the electronic business card.

9. The system of claim 1, wherein the electronic business card further includes a security element, the security element being configured to control when information is presented on the display element and only after verification of the intended recipient.

10. The system of claim 9, wherein the security element includes a biometric sensor.

11. The system of claim 1, wherein the electronic business card further includes a transfer element operable to transmit card owner permissioned information from the electronic business card to a receiving device.

12. A method comprising:
receiving configuration instructions for configuring a specific instantiation of an electronic business card to be provided to an intended recipient, the electronic business card being a hand-held, physical device, wherein the configuration instructions include instructions for setting a level of detail for information to be presented on the specific instantiation of the electronic business card, and wherein the configuration instructions include commands for initial instantiation of the electronic business card and subsequent reconfiguration commands for changing presentation of information on the electronic business card;
identifying information about a user, the information including a plurality of levels of detail including at least two different levels of detail;
evaluating the received configuration instructions and setting a level of detail for the specific instantiation of the electronic business card, wherein setting the level of detail includes:
identifying a portion of information from the identified information for storage on the specific instantiation of the electronic business card, the level of detail based on categories of card-holders including a per-card-instance or a per-cardholder-type basis and an extent of business and personal information to be provided to the card-holders in each category; and
communicating a level of detail command to the specific instantiation of the electronic business card for initial instantiation of the electronic business card to enable configuration of the specific instantiation of the electronic business card so as to present a user-selectable portion of the information on a display of the specific instantiation of the electronic business card;
presenting, by the specific instantiation of the electronic business card when prompted, the information about the user at a level of detail in accordance with the received configuration instructions without displaying other portions of information about the user that are at a different level of detail; and
communicating subsequent reconfiguration commands for changing presentation of information on the electronic business card.

13. The method of claim 12, wherein the electronic business card is configured to store plural different levels of detail about the user, wherein the level of detail command identifies a specific level of detail from the plural different levels of detail about the user, wherein the intended recipient belongs to a group of card-holders of a given per-cardholder-type for which the specific level of detail applies, and wherein a controller of the electronic business card is operable to control, on a display element of the electronic business card, display of only information associated with the specific level of detail to the recipient.

14. The method of claim 13, wherein the plural different levels of detail include a business-only level, a personal-only level, a business-and-personal level, and a customized level, wherein the business-only level is associated with business contact information of the user, wherein the personal-only level is associated with personal contact information for the user, wherein the business-and-personal level includes at least a portion of both the business and personal contact information, and wherein the customized level includes a user-selected combination of business contact, personal contact and other information.

15. The method of claim 13, wherein memory of the electronic business card includes all of the information on each instantiation of the electronic business card but a controller of the electronic business card controls which portion is available for display on the display element based on commands received from a configuration element of the electronic business card.

16. The method of claim 12, wherein a configuration element of the electronic business card is associated with a storage element of the electronic business card that stores the information about the user including information at plural different levels of detail, and wherein the configuration element is operable to provide the information to the electronic business card via an electronic interface of the electronic business card.

17. The method of claim 16, wherein the configuration element provides only a selected portion of the information to a specific instantiation of the electronic business card based at least in part on the received configuration instructions.

18. The method of claim 12, comprising remotely erasing the information in memory of the electronic business card without having to have physical possession of the electronic business card.

19. The method of claim 12, wherein the electronic business card further includes a security element, the security element being configured to control when information is presented on a display element of the electronic business card and only after verification of the intended recipient.

* * * * *